United States Patent Office 3,048,574
Patented Aug. 7, 1962

3,048,574
PROCESS FOR POLYMERIZING LOWER OLEFINS
Egon Wiberg and Robert Hartwimmer, Munich, and Albert Gustav Martin Gumboldt, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 14, 1958, Ser. No. 748,136
Claims priority, application Germany July 12, 1957
16 Claims. (Cl. 260—93.7)

The present invention relates to a process for polymerization of lower olefins.

It is known to polymerize olefinic hydrocarbons and a great number of polymerization initiators have been proposed for this purpose. For example, anions, such as $(BF_3OH)^-(ClCl_4)^-$ can be used as initiators for polymerizing ethylene and propylene to form preferably liquid viscous polymers having a branched structure and a molecular weight between about 500 and 3000. Compounds capable of forming free radicals have been proposed for polymerizing ethylene to yield solid polymers of high molecular weight and a relatively low degree of branching; however, this reaction must generally be carried out under high pressure. It was a great advance in industry when highly efficient initiators were found that rendered it possible to obtain almost unbranched linear, solid polymers of the nature of plastics under low or normal pressure. These catalyst systems which have become known more recently consist of at least two metal salts or metal compounds of which at least one is of variable valency. Processes of this kind are designated as low pressure polymerization processes and are described by Raff, Allison, "Polyethylene," 1956, pages 72 to 81, particularly page 78 et seq. It has also been proposed to use only one metal compound as catalyst; in this case, however, the metal compound is present in different valencies.

The knowledge of the mechanism of the polymer reactions carried out with these catalyst systems is still incomplete and in part hypothetic. It appears, however, that a reduction of one or more metal compounds to a lower valency is necessary for the formation of an efficient catalyst. As metal compounds which can be reduced to a lower valency by appropriate measures, there have been mentioned those of sub-groups I to VIII of the periodic table, the rare earth metals, thorium and uranium.

The aforesaid metal compounds are converted into substances activating the polymerization by treating them with metals, hydrides, or alkyl or aryl compounds of the elements of main groups I to III of the periodic table. Organo-metal compounds of main group IV of the periodic table have also been proposed as activators.

The compounds of the transition elements are reacted with the metals and compounds indicated above as activators either in a concentrated form or in an inert solvent and either in the presence of inert gases or in the presence of the monomers to be polymerized. It has also been proposed to react the aforesaid compounds in the gaseous phase if they are sufficiently volatile.

Of the great number of combinations offered by sub-groups I to VIII and main groups I to IV of the periodic table only few are suitable for use in industry since only few of them yield catalyst systems that, on the one hand, sufficiently activate the polymer reaction and, on the other hand, can be removed from the polymer as easily as is necessary in view of the fact that not all of these elements which may possibly be retained in the polymer as "contaminations" are physiologically harmless. If the polymers are to be made into articles to be used in technical industries, the physiological harmlessness of the polymer is of minor interest, it becomes, however, important if the polymers are made into commodities for daily use.

Now we have found that catalyst systems of excellent activity for the polymerization of olefins, preferably olefins containing up to 12 carbon atoms, can be obtained by treating compounds of elements of sub-groups I to VIII of the periodic table, inclusive of the compounds of the rare earth metals, with hydrogen compounds of silicon.

Silanes, such as monosilane, disilane, trisilane and the higher homologues thereof are easily accessible, for example when silicon dioxide is reacted with magnesium powder and the magnesium silicide $Mg_2Si$ which has an intense, light blue coloration is decomposed with dilute hydrochloric acid. The resultant mixtures contain higher homologues $Si_nH_{2n+2}$ in addition to $SiH_4$ and can be separated by fractionation under reduced pressure. If compounds of the transition elements are used for the reaction, such a separation may be dispensed with. There may be used the crude gas mixture of the silanes obtained which consists, for example, to the extent of 65% of monosilane and disilane and to the extent of 35% of polysilanes, the ratio of monosilane to disilane being, for example, 40%:60%. There may also be used those derivatives of the silanes in which a part of the hydrogen atoms is substituted by halogen, nitrogen or oxygen, for example $SiH_3Br$ (boiling point+1.9° C.), $SiH_2Cl_2$ (boiling point+8.5° C.), the ether $SiH_3.O.SiH_3$ (boiling point —15° C.), the rapidly polymerizing prosiloxane $SiH_2O$ and $(SiH_3)_3N$ (boiling point 52° C.). It is also possible to use the $Mg_2Si$ itself for the reaction, for example with $TiCl_4$, though the result is not so good; in this case the resulting polymer has a higher ash content.

Depending on the reactivity of the reactants, the reaction of the hydrogen-containing silicon derivatives with compounds of the transition elements may be carried out at a temeprature in the range of 0° C. and +200° C., advantageously at a temperature which permits of a fairly short reaction time, i.e. a temperature within the range of +100° C. and 150° C. The ratio of the heavy metal component to the silane may vary within wide limits and may, for example, be in the range of 0.5:1 to 1:6, a ratio greater than 1, i.e. a proportion in which the silicon component is present in excess, being advantageous.

If the heavy metal compounds are sufficiently volatile, the compounds of the transition elements may be reacted with the silanes in the gaseous phase or in the form of aerosols. The reaction may also be carried out in organic solvents which are free from active groups and will not give rise to undesired side reactions with the reactants. Exemplary of these organic solvents are petroleum fractions free from olefins and freed from sulfur and oxygen compounds by a refining process (boiling point, for example, 160 to 250° C.), well defined normal or iso-paraffins, such as hexane, heptane or octane, aromatic substances, such as toluene or xylene or alicyclic substances, such as methylcyclohexane and ethylcyclohexane.

As polymerization catalyst the crude mixture of the reaction products of the transition elements with the silanes may be used. It is, however, advantageous to wash this mixture, prior to its application, with neutral hydrocarbons as they have been mentioned above and thus to remove side reaction products which often interfere with the polymer reaction.

The polymerization may be carried out continuously or discontinuously under atmospheric or a slightly superatmospheric pressure of, for example, up to 20 atmospheres (gage).

As solvents or dispersing agents there may be used all compounds which do not participate in the polymer reaction, that is to say compounds which are free from reactive atoms or atom groups which in certain circumstances may influence and be influenced by the catalyst. There are particularly to be mentioned fractions of synthetic hydrocarbons or of petroleum which fractions are free from sulfur, oxygen and olefins. It is also possible to use well defined compounds of the paraffin series, such as propane, butane, pentane, hexane or heptane. Aromatic substances, such as xylene and ethylbenzene, or alicyclic substances, for example ethylcyclohexane, may also be used with success. The polymerization may be carried out in the liquid monomers themselves if the critical temperature of the monomers is above the polymerization temperature.

As monomers which can be polymerized in this manner according to the invention ethylene and its Δ-1-homologues, such as propylene, butene-(1) and pentene, may be mentioned. Other α-olefins with side chains, such as 3-methyl-butene-(1), 4-methyl-pentene-(1) and 4,4-dimethyl-pentene-(1) and olefins containing aromatic or alicyclic radicals, may also be converted into polymers. It is further possible to convert mixtures of these olefin classes into copolymers.

The following examples serve to illustrate the invention but they are not intended to limit it thereto.

*Example 1*

Into a 10 liter pressure vessel of stainless steel there were introduced 100 millimols of titanium tetrachloride dissolved in 200 milliliters of a diesel-oil fraction free from sulfur, oxygen and olefins and boiling between 200 and 250° C. The whole was cooled to −120° C. and in the cooled vessel there was condensed a mixture of silanes which had been obtained by reacting 175 grams of a magnesium silicide mixture with hydrochloric acid of 10% strength and dried in towers by means of calcium chloride with addition of nitrogen free from oxygen. While rotating the pressure vessel, the whole was heated for 5 hours at 150° C. and then allowed to cool. The silane mixture in excess was blown off with recondensation and the product was washed three times with ethylene. 4.8 liters of the diesel oil fraction were subsequently introduced, while washing with ethylene, the pressure vessel was closed and the whole heated at 80° C. while rotating the pressure vessel, and the ethylene was introduced in an amount, such that the pressure did not exceed 10 atmospheres (gage). After 4 hours about 0.8 kilogram of ethylene had been absorbed. The introduction of ethylene was then interrupted and the polymerization was continued until the pressure had dropped to 1 atmosphere absolute. 100 milliliters of n-butanol were then introduced by means of a pump. The whole was heated for 30 minutes at 80° C. The polymer constituting a fine white powder was suction-filtered, washed with the diesel oil fraction and stirred three times at 80° C. with 1 liter of sodium hydroxide solution of 4% strength to which 0.2% of a surface-active substance had been added. Finally, the still adhering portions of diesel oil were removed by means of a current of steam. After drying, about 800 grams of a fine white polyethylene powder were obtained which had an ash content of 0.01% (determined as sulfate ash). $\eta$ spec/c.=2.45 (determined in a solution of 0.5% strength in tetrahydronaphthalene at 120° C.)

*Example 2*

A reaction product obtained as described in Example 1 from titanium tetrachloride and a mixture of silanes was diluted with 200 milliliters of n-heptane and pressed under nitrogen, with thorough exclusion of atmospheric oxygen and moisture, through a stirring frit and washed several times with n-heptane of 80° C. until the filtrate after the hydrolysis with water contained less than 2 millimols of HCl per liter of wash liquid. The very fine-grained light brown precipitate was suspended in 5 liters of n-heptane and introduced by means of a pump into a 10 liter pressure vessel of stainless steel provided with a stirrer. 1.5 liters of very pure distilled liquid propylene were introduced into the vessel under pressure and the whole was heated, while stirring, at 50° C. until the pressure had dropped to 1 atmosphere absolute. After working up as described in Example 1, about 700 grams of a fine white polypropylene powder were obtained. The product melted at 160 to 165° C. and had an ash content of 0.01%. $\eta$ spec/c.=15.7 (determined in a solution of 0.5% strength in tetrahydronaphthalene at 130° C.). From the solvent a small amount of an amorphous rubber-like propylene could be isolated.

*Example 3*

100 grams of very pure 4-methylhexene-(1) boiling at 86.8 to 87° C. were heated to 95° C. in a 350 milliliter pressure vessel made of glass and provided with a crown cap with a Perbunan packing, after the vessel and the monomer had been rinsed for a prolonged time in the cold with very pure nitrogen free from oxygen. Through an opening made in the metal of the crown cap by punching, 20 milliliters of a heptane dispersion obtained as described in Example 2 and containing, in 20 milliliters, 5 millimols of $TiCl_3$ (titrated with CeIV) were introduced into the vessel by means of an injection syringe, the needle of which had been passed through the Perbunan packing and the whole was shaken for 12 hours on a water bath. The product was allowed to cool, suction-filtered, stirred with n-butanol of 50° C., stirred three times with sodium hydroxide solution of 4% strength of 50° C., washed with water and dried. A fine white polymer powder melting at 186 to 188° C. was obtained.

*Example 4*

Catalyst mixture: Titanium tetrachloride and trisisoamyloxysilane.

Into a 0.5 liter autoclave provided with a stirrer and electrical heating with automatic temperature regulation there were introduced, one after the other, 220 milliliters of hydrogenated diesel oil freed from oxygen and sulfur compounds and boiling at 200 to 250° C., 3 milliliters (=27.3 millimols) of $TiCl_4$ and 11 grams (=38 millimols) of tris-iso-amyloxysilane $(C_5H_{11}O)_3SiH$. During the introduction of these substances the reaction vessel was rinsed well and superposed with thoroughly purified nitrogen. The autoclave was closed, the stirrer started and the reaction mixture heated to 80 to 90° C. At the same time ethylene was introduced under a pressure of 20 atmospheres (gage). Within 90 minutes the pressure dropped to 8 atmospheres (gage) and was then again raised to 20 atmospheres (gage). After a further hour ethylene was again introduced under a pressure of 10 atmospheres (gage). The polymerization was then continued until the pressure had dropped to about 1 to 2 atmospheres (gage) and the autoclave was then opened. The brown pasty mass was washed under nitrogen into an Erlenmeyer flask and immediately decomposed with n-butanol. The white polymer was separated from the reaction solution by filtering with suction, washed well with butanol and methanol, taken up in hot alcoholic potassium hydroxide solution and well stirred for some hours. Thereafter the product was again separated dried with suction, washed with alcohol and dried at 100° C. The yield amounted to 25 grams (=about 0.9 mol).

*Example 5*

Catalyst mixture: Vanadium oxychloride and diethoxysilane.

4 grams (=33 millimols) of diethoxysilane $(C_2H_5O_2)SiH_2$ were dissolved in 200 milliliters of degassed hydrogenated diesel oil which had been freed from oxygen and sulfur compounds and had a boiling point of 200 to 250° C. The resulting solution was introduced under a nitrogen shower into the reaction chamber of a 0.5 liter autoclave. 65 milliliters (=29 millimols) of a $VOCl_3$ solution in the aforesaid hydrocarbon, which solution contained, per milliliter, 77 milligrams of VOCl₃, were added by means of a pipette. The autoclave was rapidly closed, the stirrer started and the mixture heated to 70° C. Shortly thereafter ethylene was introduced into the reaction mixture under a pressure of 40 atmospheres (gage). The absorption of ethylene could be well controlled by means of the manometer pressure and from time to time fresh ethylene was introduced under pressure. After 7 to 8 hours the experiment was finished, the residual gas blown off and the autoclave opened. The reaction mixture which contained a great proportion of polymer was immediately treated with butanol and the polyethylene obtained as a pure white product was separated from the reaction solution, thoroughly washed, aftertreated with alcoholic KOH and finally dried at 100° C. in a drying chamber.

We claim:

1. In a process for the preparation of a linear high molecular weight polyethylene by the low pressure polymerization of ethylene, the step of employing as the catalyst the reaction product of titanium tetrachloride and trisiso-amyloxysilane $(C_5H_{11}O)_3SiH$, these two compounds being the sole reactants employed in the preparation of the catalyst.

2. In a process for the preparation of a linear high molecular weight polyethylene by the low pressure polymerization of ethylene, the step of employing as the catalyst the reaction product of vanadium oxychloride and diethoxysilane $(C_2H_5O_2)SiH_2$, these two compounds being the sole reactants employed in the preparation of the catalyst.

3. In a process for the preparation of a linear high molecular weight olefin polymer by the low pressure polymerization of an α-monoolefin of 2–12 carbon atoms, the step of employing as the catalyst the reaction product of a compound of the metals selected from subgroups IVa–Va of the Mendeleef periodic table with a silane containing a silicon-to-hydrogen bond and also containing substituents selected from the group consisting of oxygen, alkoxy, amine and halogen substituents, these two ingredients being the sole components of the catalyst.

4. The process of claim 3 wherein the olefin is ethylene.

5. The process of claim 3 wherein the olefin is propylene.

6. The process of claim 3 wherein a mixture of olefins is polymerized.

7. The process of claim 3 wherein the polymerization is conducted in a liquid hydrocarbon.

8. In a process for the preparation of a linear high molecular weight polyolefin by the low pressure polymerization of an α-monoolefin of 2–12 carbon atoms, the step of employing as the sole catalyst the reaction product of a compound of an element of subgroups IVa to Va of the Mendeleef Periodic Table with $SiH_3Br$.

9. In a process of the preparation of a linear high molecular weight polyolefin by the low pressure polymerization of an α-monoolefin of 2–12 carbon atoms, the step of employing as the sole catalyst the reaction product of a compound of an element of subgroups IVa to Va of the Mendeleef Periodic Table with $SiH_2Cl_2$.

10. In a process for the preparation of a linear high molecular weight polyolefin by the low pressure polymerization of an α-monoolefin of 2–12 carbon atoms, the step of employing as the sole catalyst the reaction product of a compound of an element of subgroups IVa to Va of the Mendeleef Periodic Table with $SiH_3.O.SiH_3$.

11. In a process for the preparation of a linear high molecular weight polyolefin by the low pressure polymerization of an α-monoolefin of 2–12 carbon atoms, the step of employing as the sole catalyst the reaction product of a compound of an element of subgroups IVa to Va of the Mendeleef Periodic Table with polymeric $SiH_2O$.

12. In a process for the preparation of a linear high molecular weight polyolefin by the low pressure polymerization of an α-monoolefin of 2–12 carbon atoms, the step of employing as the sole catalyst the reaction product of a compound of an element of subgroups IVa to V of the Mendeleef Periodic Table with $(SiH_3)_3N$.

13. The process of claim 3, wherein the metal of subgroups IVa to Va is titanium.

14. The process of claim 3, wherein the metal from subgroups IVa–Va is vanadium.

15. The process of claim 3, wherein the compound of a metal of subgroups IVa to Va is titanium tetrachloride.

16. The process of claim 3, wherein the compound of a metal of subgroups IVa to Va is vanadium oxychloride.

References Cited in the file of this patent

UNITED STATES PATENTS

| 2,441,214 | Thomas | May 11, 1948 |
| 2,893,984 | Seelbach et al. | July 7, 1959 |
| 2,938,000 | Wanless et al. | May 24, 1960 |

FOREIGN PATENTS

| 569,387 | Belgium | Jan. 1959 |

(Derwent Belgian Patent Report #49B, page C15.)

| 573,649 | Belgium | Mar. 1959 |

(Derwent Belgian Patent Report #52A, page A12.)